United States Patent
Ostrozynski

[15] 3,700,712
[45] Oct. 24, 1972

[54] PROCESS FOR PREPARING SILICON PEROXIDE COMPOUNDS

[72] Inventor: Robert Leopold Ostrozynski, Mahopac, N.Y.

[73] Assignee: Union Carbide Corporation, New York, N.Y.

[22] Filed: Sept. 7, 1971

[21] Appl. No.: 178,453

[52] U.S. Cl.........................260/448.2 E, 260/46.5 R
[51] Int. Cl..................................................C07f 7/08
[58] Field of Search...............................260/448.2 E

[56] References Cited

UNITED STATES PATENTS 3,458,546   7/1969   Dannley et al. ..260/448.2 E X
3,478,074   11/1969   Omietanski.........260/448.2 E

*Primary Examiner*—Tobias E. Levow
*Assistant Examiner*—P. F. Shaver
*Attorney*—Paul A. Rose et al.

[57] ABSTRACT

A process for preparing a silicon peroxide compound comprising reacting a dimethylamino silicon compound with a hydroperoxide compound.

17 Claims, No Drawings

PROCESS FOR PREPARING SILICON PEROXIDE COMPOUNDS

BACKGROUND OF THE INVENTION

This invention relates to a method for preparing silicon peroxide compounds in which the peroxide oxygen atom is directly bonded to a silicon atom. More particularly this invention relates to a method for preparing silicon peroxides by reacting a silicon-nitrogen compound with a peroxide compound.

Heretofore, silicon peroxide compounds have generally been prepared by the classical manner involving the reaction of a halogen-silicon compound with a peroxide compound in the presence of an amine base. This reaction can be illustrated by the following equation

$$\equiv SiX + HOOR \xrightarrow{Base} \equiv SiOOR + Base \cdot HX \quad (I)$$

However this method suffers from a number of disadvantages. For instance, the reaction is very difficult to carry out cleanly, since one equivalent of base is required to be present for each $\equiv$SiOOR bond formed, and the amine base in turn reacts with the liberated hydrogen halide to produce an undesirable amine hydrohalide by-produce. Moreover, the yields of desired silicon peroxide product are generally extremely small. These low yields and the inefficiency of the process can be attributed for the main part to the amine hydrohalide salt by-product which forms a particulate bulky precipitate that thickens the reaction mass, obstructs filtration and occludes much of the product. To combat this, diluents are often employed, but to be effective large amounts of such diluents are necessary which also reduce the batch yield. Furthermore, the separation of diluent from the silicon peroxide product incurs additional processing time, equipment and expense.

It has also been suggested that peroxy silanes can be prepared by reacting a hydroaminesilane with a peroxide as shown by Pike and Shaffer, "Chemical Abstracts", Vol. 52, page 4471 g (1958) and illustrated by the following equation:

$$(CH_3)_3SiNHR + (CH_3)_3C-OOH \rightarrow (CH_3)_3SiOOC(CH_3)_3 + RNH_2 \quad (II)$$

wherein R presumably represents a hydrocarbon radical. However, even this process is reported to give very low yields of the desired silicon peroxide product.

SUMMARY OF THE INVENTION

It has now been discovered that the above problems and disadvantages can be overcome and that high yields of silicon peroxide compounds can be produced by the instant invention which comprises reacting a dimethylaminosilicon compound with a peroxide compound.

Therefore, it is an object of this invention to provide an efficient and economical process for producing high yields of silicon peroxide compounds. Other objects and advantages of this invention will become readily apparent from the following description and appended claims.

More specifically the general reaction of the instant invention can be illustrated by the following skeletal equation:

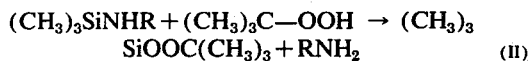

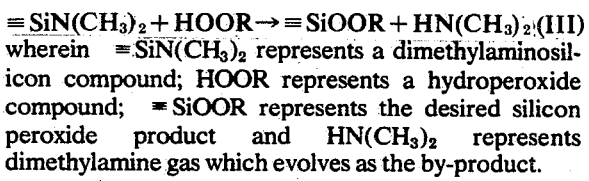

$$\equiv SiN(CH_3)_2 + HOOR \rightarrow \equiv SiOOR + HN(CH_3)_2 \quad (III)$$

wherein $\equiv SiN(CH_3)_2$ represents a dimethylaminosilicon compound; HOOR represents a hydroperoxide compound; $\equiv$SiOOR represents the desired silicon peroxide product and $HN(CH_3)_2$ represents dimethylamine gas which evolves as the by-product.

DESCRIPTION OF THE PREFERRED EMBODIMENTS

The expression dimethylaminosilicon compound as employed herein is used to define any silicon compound containing at least one silicon bonded dimethylamino group, $\equiv Si-N(CH_3)_2$. The particular dimethylaminosilicon compound that may be employed by this invention is not limited to any particular class or type of silicon, but is broadly applicable to all classes and types of silicons such as silanes, siloxane polymers, whether they be cyclic, linear branched, crosslinked, homopolymers, copolymers or terpolymers as well as silyl compounds. Said silicon compounds may be monofunctional or difunctional, i.e., compounds which have one or two dimethylamino radicals attached to the same silicon atom. Silicon compounds of higher functionality, i.e., compounds which have three or more dimethylamino radicals attached to the same silicon atom are to be avoided, since they result in side reactions which destroy the result of a high yield of desired product. However, it should be understood that if a siloxane compound is employed, it can contain any number of monofunctional or difunctional silicon dimethylamino units. Such silicon dimethylamino compounds useful in the practice of this invention, as well as methods for their preparation are well known in the art.

Examples of such starting materials include silanes having the formula

$$R_nSi[N(CH_3)_2]_{4-n} \quad (IV)$$

wherein R represents hydrogen or a substituted or unsubstituted monovalent hydrocarbon radical having from one to 18 carbon atoms and n is an integer of from 2 to 3 inclusive.

Examples of siloxanes are those compounds composed essentially of groups having the formula

$$R_a\underset{|}{\overset{X_b}{Si}}O_{\frac{4-(a+b)}{2}} \quad (V)$$

wherein R is the same as defined above; X represents a dimethylamino radical; a has a value of from 0 to 3 inclusive; b is an integer of from 0 to 2 inclusive and the sum of (a+b) is an integer of from 1 to 3 inclusive, with the proviso that at least one silicon (Si) atom of the siloxane is directly bonded to at least one dimethylamino (X) radical.

Examples of silyl compounds that can be used as starting materials of this invention are those of the formula

$$R_nSi\underset{|}{\overset{X_{3-n}}{}}-Y-\underset{|}{\overset{X_{3-n}}{Si}}R_n \quad (VI)$$

wherein R, X and n are the same as defined above; and wherein Y is a divalent bridging group selected from the group consisting of alkylene and arylene radicals; with the proviso that at least one silicon (Si) atom is directly bonded to at least one dimethylamino (X) radical and the proviso that no one silicon (Si) atom has more than two dimethylamino (X) radicals bonded to it.

As noted above, R in formulas (IV), (V) and (VI) may be any monovalent hydrocarbon group. Among the more specific radicals that may be mentioned are, for example, alkyl radicals, such as methyl, ethyl, propyl, butyl, isobutyl, amyl, hexyl, octadecyl and the like; alkenyl radicals, such as vinyl, allyl, butenyl, cyclopentenyl, cyclohexenyl and the like; alicyclic radicals, such as cyclopentyl, cyclohexyl and the like; aryl radicals such as phenyl, naphthyl, and the like; aralkyl radicals such as benzyl, phenylethyl and the like; and alkaryl radicals such as tolyl, xylyl, mesityl and the like. Moreover any substituent which does not effect the exxential performance of the instant process may be present on said hydrocarbon radicals.

The preferred dimethylaminosilicon starting materials are (1) silanes having the formula

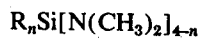  (VII)

wherein each R is individually a member selected from the class consisting of hydrogen, methyl, ethyl, vinyl, allyl and phenyl radicals, especially methyl, and n is an integer of from 2 to 3 inclusive; and (2) linear siloxanes having the formula

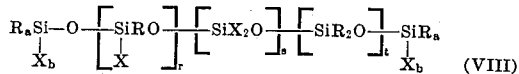 (VIII)

wherein X is a dimethylamino radical; each R is individually a member selected from the class consisting of hydrogen, methyl, ethyl, vinyl, allyl and phenyl radicals, especially methyl; wherein a is an integer of from 1 to 3; wherein b has a value of from 0 to 2 inclusive; wherein r has a value of from 0 to 1000 inclusive; wherein s has a value of from 0 to 1000 inclusive and wherein t has a value of from 0 to 1000 inclusive, with the proviso that at least one of the symbols b, r or s has a value of at least 1. Of course, it is to be understood that the internal siloxy units of the above siloxane formula may be present in any random fashion or order. As a class the silane compounds are the most preferred.

Specific examples of such silicon compounds include, for example, $H_3SiNMe_2$; $H_2Si(NMe_2)_2$; $HMe_2SiNMe_2$; $Me_3SiNMe_2$; $Me_2Si(NMe_2)_2$; $Et_3SiNMe_2$; $ViMeSi(NMe_2)_2$; $(CH_2=CH-CH_2-)Me_2SiNMe_2$; $Me_2SiNMec2$; $(Me_3SiO)_2MeSiNMe_2$; $(Me_3SiO)_2(MeSiNMe_2)_3$; $Me_3SiO(SiMe_2O)_{10}(MeSiNMe_2O)SiMe_3$; $Me_3SiO(SiMe_2O)(MeViSiO)Me_2SiNMe_2$; $Me_3SiO(Me_2SiO)_{100}Me_2Si-NMe_2$; $Me_3SiO(Me_2SiO)_5(\phi_2SiO)Me_2SiNMe_2$; $Me_2NSiMe_2O(MeHSiO)-Me_2SiNMe_2$; $Et_3SiO(Et_2SiO)_{10}Et_2SiNMe_2$; $Me_2N(Me_2SiO)Me_2-SiNMe_2$; $Me_2N(Me_2SiO)_4Me_2SiNMe_2$; $Me_2N(Me_2SiO)_8Me_2SiNMe_2$; $Me_3SiOSiMe(NMe_2)_2$; and the like wherein Me represents a methyl radical ($-CH_3$), Et represents an ethyl radical ($-C_2H_5$), Vi represents a vinyl radical ($-CH=CH_2$) and $\phi$ represents a phenyl radical ($-C_6H_5$).

Any organic hydroperoxide compound containing one or two hydroperoxy groups (—OOH) may be employed in the practice of this invention. Illustrative of such hydroperoxides are: hydrogen peroxide; methyl hydroperoxide; ethyl hydroperoxide; propyl hydroperoxide; isopropyl hydroperoxide; n-butyl hydroperoxide, sec-butyl hydroperoxide, t-butyl hydroperoxide; t-amyl hydroperoxide; 1,1-diethylpropyl hydroperoxide; 1,1,2-trimethylpropyl hydroperoxide; 1-methylhexyl hydroperoxide; 1,1,2,2-tetramethylpropyl hydroperoxide; cyclohexyl hydroperoxide; 4-methylcyclohexyl hydroperoxide; trans-decalin hydroperoxide (trans-decahydro-4α-napthyl hydroperoxide); hexahydro-3α-indanyl hydroperoxide; 2,5-dihydroperoxy-2,5-dimethylhexane (2,5-dimethylhexylidene 2,5-hydroperoxide); 2,7-dihydroperoxy-2,7-dimethyloctane (2,7-dimethyloxtylidene 2,7-hydroperoxide); 2-hydroperoxy-2,4-dimethyl-3 pentanone; 1,1,6,6-tetrahydroperoxycyclodecane; 2-cyclopenten-1-yl hydroperoxide; 2-cyclohexen-1-yl hydroperoxide; 2-methyl-2-cyclohexen-1-yl hydroperoxide; 2,3-diemthyl-2-cyclohexen-1-yl hydroperoxide; d, 1-3-p-methenyl-8-hydroperoxide; 3-methyl-3-hydroperoxy-1-butyne(1,1-dimethyl-2-propynyl hydroperoxide); 2,5-dimethyl-2,5-dihydroperoxy-3-hexyne (1,1,4,4-tetramethyl-2-butynylene dihydroperoxide); α-methylbenzyl hydroperoxide; α, α - dimethylbenzyl hydroperoxide; α-methyl-α-ethylbenzyl hydroperoxide; α-p-xylyl hydroperoxide; diphenylmethyl hydroperoxide; triphenylmethyl hydroperoxide; tetralin hydroperoxide (1,2,3,4-tetrahydro-1-naphthyl hydroperoxide); 1,2,3,4-tetrahydro-1-methyl-1-naphthyl hydroperoxide; 9-fluorenyl hydroperoxide; 1-indanyl hydroperoxide; tetrahydro-2-furyl hydroperoxide; tetrahydroarbazole hydroperoxide (1,2,3,4-tetrahydro-4αH-isocarbazol-4α-yl hydroperoxide), and 2,3-dimethyl-3-hydroperoxy butene-1.

The preferred hydroperoxides employable in the practice of this invention are those encompased by the formula $R'(OOH)_b$ wherein $R'$ represents a hydrocarbon radical having from one to 30 carbon atoms, such as alkyl, aryl, aralkyl, cycloalkyl, arylcycloalkyl and the like, and wherein b is an integer of 1 or 2 and wherein the hydroperoxy groups (—OOH) are bonded to the hydrocarbon radical by a non-carbonyl carbon atom.

The manner and order in which the reaction components are mixed is not critical. In general the organic hydroperoxide is placed in a suitable reaction vessel and the silicon-nitrogen compound is added, preferably with moderate agitation and the reaction mass heated to its desired temperature. During the reaction the temperature may rise as a result of the spontaneous generation of heat from the reaction. If the heat rise is substantially higher than desired it can be controlled by cooling the reaction mass. Solvents, while not necessary, can be used if desired for the purpose of dehydrating the organic hydroperoxide before its reaction with the silicon-nitrogen compound. This may be done by heating the mixture of organic hydroperoxide and any conventional solvent to boiling and removing the water as a binary azeotrope prior to addition of the silicon-nitrogen compound. Typical examples of such conventional solvents include hydrocarbons, halohydrocarbons, ethers, tertiary amines and the like. Catalysts are not required by the instant invention, but may be used if desired to help accelerate sluggish reactions. Examples of such catalysts are those conventional catalyst used in known reactions of silicon-nitrogen compounds with hydroxy compounds such as organic acids, e.g., trifluoracetic acid, β-chloroproprionic acid and the like. Of course, it should be understood that while it is preferred to react a single silicon-nitrogen compound with a single organic hydroperoxide compound, various mixtures and combinations of such reactants can be employed if desired. Moreover, while it is preferred to employ the organic hydroperoxides without complexing aids, it should be understood that they can also be employed in the form of amine complex salts, such as the hydroperoxide adducts (e.g. t-butylhydroperoxide) of triethylene diamine, if desired, as described in U.S. Pat. No. 3,236,850.

The instant process is generally carried out at room temperature 20° to 25°C. and at ambient pressure (about one atmosphere). However, the temperature is not narrowly critical and sluggish reactions can be accelerated by raising the reaction temperature to 50° to 60°C. The maximum temperature is, of course, limited by the decomposition temperature of the organic hydroperoxide or the boiling point of either one of the reactants which will seldom exceed 100°C. On the other hand temperatures below room temperature can also be used if desired. The minimum temperature will be governed by the fusion point of either of the reactants and −10°C. would be considered to be a practical lower limit. The reaction pressure can of course be varied above or below ambient pressure, if desired. In view of the reactivity of both reactants toward water, alcohols and other hydroxylated substances, it is preferred that the reaction be conducted in an essentially anhydrous environment.

The amount of reactants employed in the instant reaction merely depend on whether it is desired to react all or only some of the silicon-nitrogen bonds. For example, in theory one hydrogen peroxy group is equivalent to one dimethylamino group. Accordingly, the mole amount of hydroperoxide compound employed need only contain that amount or number of hydroperoxide (—OOH) bonds that is equivalent to the amount or number of silicon dimethylamino [Si—N(CH$_3$)$_2$] bonds desired to be reacted. While amounts, that are less or in excess of said stoichiometric equivalency may be used if desired, it is preferred to employ the silicon-nitrogen compound in molar amounts that are stoichiometrically equivalent, and more preferably in amounts slightly in excess to said equivalency, to the number of hydroperoxy bonds available for reaction. By way of illustration one mole of Si—N(CH$_3$)$_2$ starting material reacted with one mole of R—OOH peroxide will give a silicon peroxy (Si—OOR) product while 2 moles of Si—N(CH$_3$)$_2$ are required when the hydro-peroxide compound is R—(OOH)$_2$ to give a silicon peroxy (Si—OO—R—OOSi) product wherein R is the remainder of the hydroperoxide starting material.

The desired silicon-peroxy product can be easily separated from the dimethylamine gas by-product by employing any conventional separation technique such as alembic vacuum distillation (stripping) sparging, and the like, upon completing of the reaction which is easily determined by gas chromatography and/or infrared spectroscopy. The isolated silicon-peroxy product is subsequently analyzed for peroxy content by iodometric titration. However, due to the fact that the dimethylamine by-product can react with the desired silicon peroxide product upon standing and cause side reactions, it is preferred to continuously vent off the dimethylamine gas by-product during the reaction or separate said by-product from the silicon peroxide as soon as possible after completion of the reaction.

The silicon peroxide products of this invention can be illustrated as those having the formula

and

wherein R is the remainder of the organic hydrogen peroxide starting material and the remaining valences of the silicon atom or atoms are satisfied by the non-amino substituents defined in formulas (IV), (V) and (VI) above.

The most preferred silicon peroxides are (1) the silane peroxides having the formula

wherein each R is individually a member selected from the class consisting of hydrogen, methyl, ethyl, vinyl, allyl and phenyl radicals, especially methyl, and $n$ is an integer of from 2 to 3 inclusive and R' is a hydrocarbon radical having from 1 to 30 carbon atoms and (2) linear siloxanes having the formula

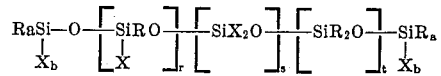

wherein R, $a$, $b$, $r$, $s$ and $t$ are the same as defined above for formula (VIII) and X is a peroxy radical having the formula —OOR' wherein R' is a hydrocarbon radical having from one to 30 carbon atoms.

The following examples are illustrative of the present invention and are not to be regarded as limitative. It is to be understood that all parts, percentages and proportions referred to herein and in the appended claims are by weight unless otherwise indicated. The symbol Me represents a methyl radical while the symbol φ represents a phenyl radical.

Examples 1–4 illustrate the facile formation of an SiOOC bond from a ≡SiNMe$_2$ silicon compound and an organic hydroperoxide.

EXAMPLE I

A 50 ml., 3 neck round bottom flask, fitted with a thermometer, a Friederich condenser which is vented to the ambient air and a 25 ml. addition funnel was charged with 9.0 grams (0.10 moles) of t-butyl hydroperoxide. 11.8 grams (0.10 moles) of distilled Me$_3$SiNMe$_2$ silane was added dropwise from the addition funnel to the contents of the reaction flask under agitation. The reaction flask was partially immersed in a circulating cold water bath to keep the reaction temperature below 35°C. On completing the addition, the product was stripped free of by-product dimethylamine, then distilled at reduced pressure. The over all yield of desired silicon peroxide product, Me$_3$SiOOC$_4$H$_9$, amounted to 14.8 grams or 92 percent theoretical. Gas chromatography showed the product to be about 90 percent pure and the infrared spectrum analysis was consistent with the structure showing the peroxy stretch at 910 cm$^{-1}$.

Analysis. Calculated for Me$_3$SiOOC$_4$H$_9$:

|  | %C | %H | %Si | % Active O$_2$ |
|---|---|---|---|---|
| Found | 48.8 | 10.8 | 13.3 | 9.3 |
| Theoretical | 51.8 | 11.2 | 17.3 | 9.9 |

EXAMPLE 2

The procedure of Example 1 was repeated except that 19.8 grams (0.010 moles) of α, α-dimethylbenzyl hydroperoxide, φMe$_2$COOH, was employed in place of the t-butyl hydroperoxide. The silicon peroxide product, Me$_3$SiOOCMe$_2$φ, was found to be about 81 percent pure.

Analysis. Calculated for Me$_3$SiOOCMe$_2$φ.

|  | % Active O$_2$ |
|---|---|
| Found | 6.3 |
| Theoretical | 7.1 |

EXAMPLE 3

The procedure of Example 1 was repeated except that 8.8 grams (0.05 moles) of 2,5-dimethyl-2,5-dihydroperoxy hexane

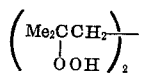

was employed in place of the t-butyl hydroperoxide. The silicon peroxide product,

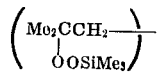

was found to be about 88 percent pure.
Analysis. Calculated for

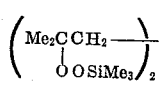

|  | % Active O$_2$ |
|---|---|
| Found | 9.5 |
| Theoretical | 9.9 |

EXAMPLE 4

A series of silicon peroxide compounds were prepared by varying the dimethylamino silicon and hydroperoxide starting materials and following the procedure of Example 1. The mole ratio of hydroperoxide (—OOH) bonds to silicon dimethylamino [Si—N(CH)$_2$] bonds was about 1 to 1. The reactants employed and products formed are shown in the following table.

As mentioned above the stability of the silicon peroxide product can be impaired by residual dimethylamine, especially in products which bear more than one peroxy group on a silicon atom. The stability of the silicon peroxide compounds is greatly improved by removing the amine by-product from the peroxide during or immediately after completing the reaction. This effect is demonstrated in the ensuing examples.

EXAMPLE 5

A 25 ml., 3 neck round bottom flask, fitted with a thermometer, a Friederich condenser and a 25 ml. addition funnel was charged with 9.0 grams (0.10 moles) of t-butylhydroperoxide. 7.3 grams (0.05 moles) of Me$_2$Si(NMe$_2$)$_2$ silane was added dropwise to the reaction flask contents over a period of about 30 min. On completing of the addition, no effort was made to remove the by-product amine. Subsequently and periodically thereafter, the product was analyzed for composition by gas chromatography. The composition as a function of time at ambient temperature is recorded below.

| Silicon Component | Time (Hr.) | | |
|---|---|---|---|
|  | 0 | 2 | 22 |
| Me$_2$Si(NMe$_2$)$_2$ | 15.0 | 0.0 | 0.0 |
| Me$_2$Si(OC$_4$H$_9$)ONMe$_2$* | 6.4 | 25.9 | 97.3 |
| Me$_2$Si(OOC$_4$H$_9$)$_2$ | 78.6 | 74.1 | 2.7 |

*This compound viz. t-butoxydimethylaminooxydi-methylsilane is the reaction product between the free amine (HNMe$_2$) and Me$_3$Si(OOC$_4$H$_9$)$_2$; its structure has been ascertained by NMR and its elemental analysis was 14.3% Si(14.7 theoretical); 48.3% C(50.1% theoretical); 10.3% H(11.0% theoretical) and 7.5% N(7.3% theoretical). NMR is nuclear magnetic resonance spectroscopy.

At the end of 22 hr., the product contained 25.5 percent active oxygen (as t-C$_4$H$_9$OOH) or about one-half of the theoretical amount.

EXAMPLE 6

The experiment in Example 5 was repeated. However subsequent to the addition, the dimethylamine by-product was removed from the product by flash evaporation under reduced pressure. The product composition by gas chromatography was:

| Me$_2$Si(OOC$_4$H$_9$)$_2$ | = | 83.8% |
| Me$_2$Si(OC$_4$H$_9$)ONMe$_2$ | = | 16.2% |

The active oxygen (as t-C$_4$H$_9$OOH) was found to be 63.1% (76.4 percent theoretical). After one month, the active oxygen (as t-C$_4$H$_9$OOH) was found to be 62.8 percent or virtually no change.

The silicon peroxide compounds of this invention are not novel and have found wide utility in the art as free radical initiators for the polymerization of vinyl monomers, e.g., styrene; as curing agents for silicon

TABLE I

| Run No. | Organosilicon compound | Hydroperoxide | Silicon peroxide product | Percent purity |
|---|---|---|---|---|
| 1 | Me$_3$SiO(Me$_2$SiO)$_2$Me$_2$SiNMe$_2$ | t-C$_4$H$_9$OOH | Me$_3$SiO(Me$_2$SiO)$_2$Me$_2$SiOOC$_4$H$_9$ | 77 |
| 2 | (Me$_3$SiO)$_2$MeSiNMe$_2$ | t-C$_4$H$_9$OOH | (Me$_3$SiO)$_2$MeSiOOC$_4$H$_9$ | 91 |
| 3 | Me$_2$N(Me$_2$SiO)$_4$Me$_2$SiNMe$_2$ | t-C$_4$H$_9$OOH | C$_4$H$_9$OO(Me$_2$SiO)$_4$Me$_2$SiOOC$_4$H$_9$ | 88 |
| 4 | Me$_2$N(Me$_2$SiO)$_4$Me$_2$SiNMe$_2$ | φMe$_2$COOH | φMe$_2$COO(Me$_2$SiO)$_4$Me$_2$SiOOMe$_2$φ | 95 |
| 5 | Me$_2$N(Me$_2$SiO)$_4$Me$_2$SiNMe$_2$ | $\left(\begin{array}{c}\text{Me}_2\text{CCH}_2\text{—}\\ \mid\\ \text{OOH}\end{array}\right)_2$ | H—[OOC—CH$_2$CH$_2$COO(SiO)$_4$SiOO]$_n$—CCH$_2$CH$_2$C—OOH (with Me$_2$ groups) | 70 | elastomers and organic plastics such as polyethylene and as coupling agents and bonding primers.

Various modifications and variations of this invention will be obvious to a worker skilled in the art and it is to be understood that such modifications and variations are to be included within the purview of this application and the spirit and scope of the appended claims.

What is claimed is:

1. A process for preparing a silicon peroxide compound which comprises reacting a dimethylamino silicon compound selected from the group consisting of silanes having the formula

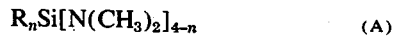    (A)

wherein R represents a member selected from the class consisting of hydrogen and monovalent hydrocarbon radicals and n is an integer of 2 or 3; siloxanes consisting essentially of groups having the formula

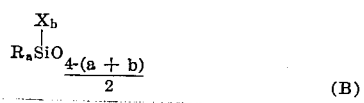    (B)

wherein R is the same as defined above, X represents a —N(CH$_3$)$_2$ radical, $a$ has a value of 0 to 3 inclusive, $b$ has a value of from 0 to 2 inclusive and the sum of ($a+b$) is an integer of from 1 to 3 inclusive, with the proviso that at least one group represented by formula (B) above contains at least one X radical; and silyl compounds having the formula

    (C)

wherein R, X and n are the same as defined above, and Y represents a divalent hydrocarbon radical, with the proviso that at least one silicon atom of formula (C) above contains at least one X radical; with a hydroperoxide compound having the formula R′(OOH)$_b$ wherein R′ represents a hydrocarbon radical having from one to 30 carbon atoms, $b$ is an integer of 1 or 2 and wherein the hydroperoxy group (—OOH) is bonded to the hydrocarbon radical by a non-carbonyl carbon atom.

2. A process as defined in claim 1 wherein the dimethylamino silicon compound is a silane having the formula R$_n$Si[N(CH$_3$)$_2$]$_{4-n}$    (A)

as defined therein.

3. A process as defined in claim 2, wherein R is a member selected from the group consisting of hydrogen, methyl, ethyl, vinyl, allyl and phenyl radicals.

4. A process as defined in claim 3, wherein R is methyl and $n$ is 3.

5. A process as defined in claim 4, wherein the hydroperoxide compound is selected from the group consisting of tertiary butyl hydroperoxide, $\phi$Me$_2$—COOH and

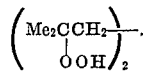

6. A process as defined in claim 3, wherein R is methyl and n is 2.

7. A process as defined in claim 6, wherein the hydroperoxide compound is tertiary butyl hydro-peroxide.

8. A process as defined in claim 1, wherein the dimethylaminosilicon compound is a siloxane consisting essentially of groups having the formula

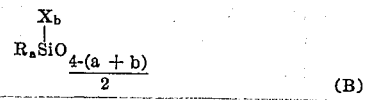    (B)

as defined therein.

9. A process as defined in claim 8, wherein the siloxane is a linear siloxane having the formula

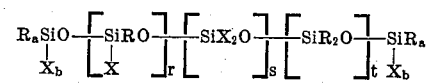

X is a —N(CH$_3$)$_2$ amino radical; wherein R is a member selected from the group consisting of hydrogen, methyl, ethyl, vinyl, allyl and phenyl radicals; $a$ is an integer of from 1 to 3; $b$ has a value of from 0 to 2, $r$ has a value of from 0 to 1000, $s$ has a value of from 0 to 1,000 and $t$ has a value of from 0 to 1,000, with the proviso that at least one of the symbols $b$, $r$ or $s$ has a value of at least one.

10. A process as defined in claim 9 wherein R is methyl, one $a$ is 2 and the other $a$ is 3; one $b$ is 1 and the other $b$ is 0; $r$ and $s$ are 0, and $t$ is an integer of from 1 to 1000.

11. A process as defined in claim 9, wherein R is methyl, $a$ is 3; $b$, $s$ and $t$ are 0; and $r$ is an integer of from 1 to 1000.

12. A process as defined in claim 9, wherein R is methyl, $a$ is 2; $b$ is 1; $r$ and $s$ are 0 and $t$ is an integer of from 1 to 1000.

13. A process as defined in claim 9, wherein the hydroperoxide compound is a member selected from the group consisting of tertiary butyl hydroperoxide, $\phi$Me$_2$COOH and

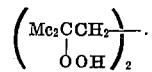

14. A process as defined in claim 9, wherein R is methyl.

15. A process as defined in claim 13, wherein R is methyl.

16. A process as defined in claim 1, wherein the dimethylamino silicon compound is a silyl compound having the formula

    (C)

as defined therein.

17. A process as defined in claim 16 wherein R is methyl.

* * * * *